United States Patent
Kumar

(10) Patent No.: US 12,043,242 B2
(45) Date of Patent: Jul. 23, 2024

(54) REPOSITIONING ROOFTOP SENSORS FOR AUTONOMOUS VEHICLES

(71) Applicant: Waymo LLC, Mountain View, CA (US)

(72) Inventor: Atul Kumar, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 250 days.

(21) Appl. No.: 17/750,849

(22) Filed: May 23, 2022

(65) Prior Publication Data

US 2023/0406282 A1    Dec. 21, 2023

(51) Int. Cl.
| | |
|---|---|
| *B60W 10/30* | (2006.01) |
| *B60R 11/04* | (2006.01) |
| *B60W 60/00* | (2020.01) |
| *G01S 13/86* | (2006.01) |
| *G01S 13/931* | (2020.01) |
| *B60R 11/00* | (2006.01) |

(52) U.S. Cl.
CPC .......... *B60W 10/30* (2013.01); *B60R 11/04* (2013.01); *B60W 60/001* (2020.02); *G01S 13/867* (2013.01); *G01S 13/931* (2013.01); *B60R 2011/004* (2013.01); *B60R 2011/0084* (2013.01); *B60R 2011/0092* (2013.01); *B60W 2420/403* (2013.01); *B60W 2420/408* (2024.01); *B60W 2520/10* (2013.01); *B60W 2530/201* (2020.02); *B60W 2556/40* (2020.02); *B60W 2710/30* (2013.01)

(58) Field of Classification Search
CPC .............. B60W 10/30; B60W 60/001; B60W 2420/403; B60W 2420/408; B60W 2520/10; B60W 2530/201; B60W 2556/40; B60W 2710/30; B60R 11/04; B60R 2011/004; B60R 2011/0084; B60R 2011/0092; G01S 13/867; G01S 13/931; G01S 2013/93273

See application file for complete search history.

(56) References Cited

U.S. PATENT DOCUMENTS

| | | |
|---|---|---|
| 9,636,981 B2 | 5/2017 | Higgins |
| 10,471,904 B2 | 11/2019 | Delp et al. |
| 10,773,732 B1 * | 9/2020 | Alexander ........... G05D 1/0212 |
| 11,242,098 B2 | 2/2022 | Patnaik et al. |
| 2020/0016951 A1 * | 1/2020 | Letizio ............... B60G 17/0165 |
| 2020/0341118 A1 | 10/2020 | Chen et al. |
| 2021/0302541 A1 | 9/2021 | Fields et al. |
| 2022/0075057 A1 | 3/2022 | Jones et al. |

* cited by examiner

*Primary Examiner* — Behrang Badii
(74) *Attorney, Agent, or Firm* — Botos Churchill IP Law

(57) ABSTRACT

Aspects of the disclosure relate to repositioning a rooftop sensor of an autonomous vehicle when needed to reduce the overall height of the autonomous vehicle. For instance, while an autonomous vehicle is being controlled in an autonomous driving mode, a low clearance zone may be identified. An activation location may be determined based on the low clearance zone and a current speed of the autonomous vehicle. Once the activation location is reached by the autonomous vehicle, a motor may be caused to reposition the rooftop sensor. In addition, in some instances, after the autonomous vehicle has passed the low clearance zone, the motor may be caused to reposition the rooftop sensor again.

20 Claims, 14 Drawing Sheets

REPOSITIONING ROOFTOP SENSORS FOR AUTONOMOUS VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

BRIEF SUMMARY

Aspects of the disclosure provide a method of repositioning a rooftop sensor. The method includes while an autonomous vehicle is being controlled in an autonomous driving mode, identifying, by one or more processors, a low clearance zone; determining, by the one or more processors, an activation location based on the low clearance zone and a current speed of the autonomous vehicle; and once the activation location is reached by the autonomous vehicle, causing a motor to reposition the rooftop sensor.

In one example, identifying the low clearance zone is based on a current route of the autonomous vehicle and the low clearance zone is defined in map information stored at the autonomous vehicle. In another example, identifying the low clearance zone is based on a current trajectory of the autonomous vehicle and the low clearance zone is defined in map information stored at the autonomous vehicle. In another example, determining the activation location is further based on a current route of the autonomous vehicle. In another example, determining the activation location is further based on a predefined amount of time for the rooftop sensor to be repositioned. In this example, determining the activation location is further based on a buffer time. In addition, determining the activation location includes adding the buffer time and the predefined amount of time and converting the time to a distance based on the current speed. In addition, determining the activation location includes measuring the distance from the low clearance zone along a current route of the autonomous vehicle. In another example, repositioning the rooftop sensor reduces a total height of the autonomous vehicle. In another example, repositioning the rooftop sensor includes collapsing a support structure. In another example, repositioning the rooftop sensor includes swiveling a support structure. In another example, the method also includes, after the autonomous vehicle has passed the low clearance zone, causing the motor to reposition the rooftop sensor by deploying a support structure. In this example, the method also includes determining a second activation location for deploying the support structure based on the low clearance zone, and wherein causing the motor to reposition the rooftop sensor is further based on the second activation location. In addition, determining the second activation location is further based on a buffer time and current speed of the autonomous vehicle. In addition, or alternatively, deploying the support structure increases a total height of the autonomous vehicle. In addition, or alternatively, before deploying the support structure, using sensor data to verify that the autonomous vehicle has passed the low clearance zone.

Another aspect of the disclosure provides a system. The system includes an autonomous vehicle; a rooftop sensor arranged on a roof of the autonomous vehicle; a motor; and a controller including one or more processors. The one or more processors are configured to, while autonomous vehicle is being controlled in an autonomous driving mode, identify a low clearance zone; determine an activation location based on the low clearance zone and a current speed of the autonomous vehicle; and once the activation location is reached by the autonomous vehicle, causing the motor to reposition the rooftop sensor.

In one example, the system also includes a support structure, and wherein the one or more processors are further configured to reposition the rooftop sensor by collapsing the support structure. In another example, the system also includes a support structure, and wherein the one or more processors are further configured to reposition the rooftop sensor by swiveling the support structure. In another example, the one or more processors are further configured to, after the autonomous vehicle has passed the low clearance zone, cause the motor to reposition the rooftop sensor by deploying a support structure.

DETAILED DESCRIPTION

Overview

Figure 1:
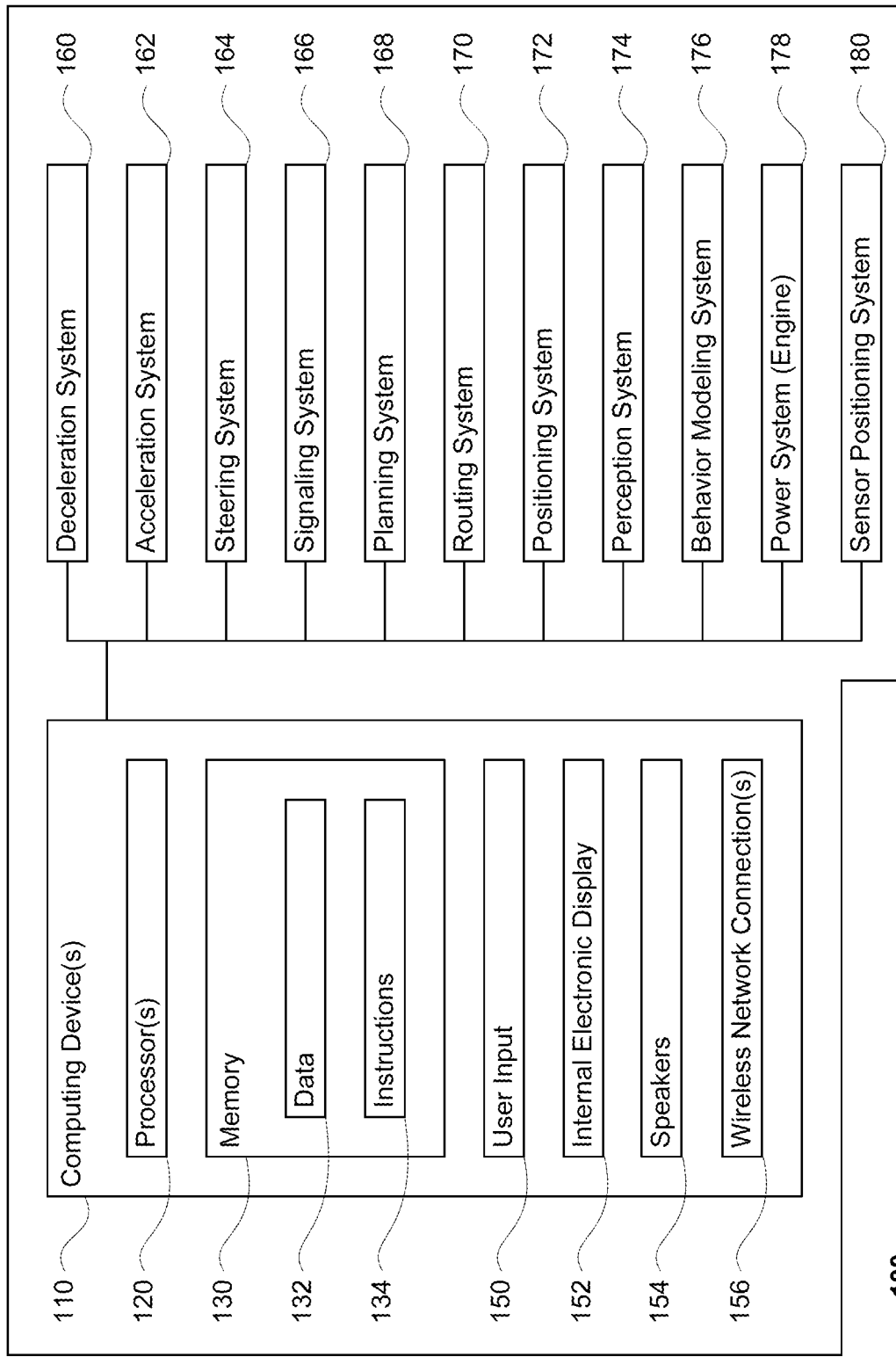
FIG. 1 is a functional diagram of an example vehicle in accordance with an exemplary embodiment.

The technology relates to enabling autonomous vehicles to utilize rooftop sensors which can adjust, as needed, to allow the autonomous vehicle to fit under obstacles of a certain height. The total vehicle height of an autonomous vehicle includes both the height of the roof of the base vehicle as well as the height of a rooftop sensor system mounted to the roof of the autonomous vehicle. The rooftop sensor system may include a plurality of sensors, such as cameras, LIDARs, radars, etc.

Thus, mounting the rooftop sensor system on the roof of the vehicle may allow for greater range or the least restricted view of the autonomous vehicle's surroundings for such sensors. In other words, a higher position may result in a better or farther field of view around the autonomous vehicle so that the autonomous vehicle can "look further ahead" (or behind or to the sides). Having a taller autonomous vehicle may provide for additional headroom and ease of access for passengers entering and exiting the autonomous vehicle, and especially passengers with disabilities including those using wheelchairs. However, in certain situations the taller total vehicle height is, the greater the limit on the ability for an autonomous vehicle to drive in certain areas. This may reduce the autonomous vehicle's service area, routing capabilities and overall efficiency, especially in dense urban markets or areas with many low height clearances.

By reducing the height of the rooftop sensor system when needed, this may improve the ability of autonomous vehicles to fit under low hanging vegetation, overpasses, bridges, and tunnels as well as low ceiling height areas within parking garages or depots. To enable a dynamic and real time adjustment of the total vehicle height, the rooftop sensor system may be able to be reduced in height as needed. This may be achieved in any number of ways using different hardware features.

While the ideal reduction in height may involve moving the rooftop sensor system to a position where it is flush with the roof of the autonomous vehicle, this may not always be feasible. However, various features may be used to simply reduce the total height. For instance, a collapsible support structure may be used to reduce the height of the rooftop sensor system. As an example, a support structure may hold the sensor system higher above the rooftop of the autonomous vehicle. Mechanical features such as one or more motors, hydraulics, pulleys, hinges, etc. may be used to control the position of the support structure. When the motor is activated in one direction, the support structure may collapse from a deployed condition to a stowed or collapsed condition, and the rest of the rooftop sensor system may be moved towards the roof of the autonomous vehicle. As such, this may reduce the total height.

When the motor is activated in another direction, the support structure may be deployed into a deployed condition, and the rest of the rooftop sensor system may be moved away from the roof of the autonomous vehicle. As such, this may position the rooftop sensor system farther from the roof improving the range but also increasing the total height.

An open configuration of the support structure may also be arranged to allow air flow to pass through the support structure and thereby better enable the support structure to withstand higher wind speeds and certain weather conditions. Of course, such considerations may be less important within service areas for such autonomous vehicles with restricted or lower speeds.

In other instances, more advanced and dynamic designs can be used to stow and deploy the support structure. For example, a support structure may swivel in order to move the rest of the rooftop sensor system to one or both sides of the autonomous vehicle or alternatively collapse and then swivel to one or both sides of the autonomous vehicle. If there is room available within the headliner of the autonomous vehicle, the support structure and/or a portion of the sensor system may be moved into a holding area (i.e., descend so that it is completely or partially below the roof of the autonomous vehicle). Other structures such as those which are used to enable falcon doors on vehicles as well as those which are used to enable spacecraft, aircraft, or space robots to fold in or expand may also be used.

As noted above, a motor may be activated to change the position of a support structure of the rooftop sensor system. This may be achieved by one or more computing devices of the autonomous vehicle. The computing devices may monitor feedback from various systems of the autonomous vehicle in order to determine when to activate the motor. For example, the computing devices may monitor information published by the autonomous vehicle's positioning system, routing system, planning system, and in some instances, perception system to determine when to activate the motor.

The computing devices may have access to map information which provides information about the autonomous vehicle's environment such as the shape and location of roads, etc. The map information may also include information about low clearance zones. Such low clearance zones may include areas with low hanging vegetation, overpasses, bridges, and tunnels as well as low ceiling height areas within parking garages or depots. Low clearance zones may be defined as points, lines between two or more points, two-dimensional areas, or three-dimensional areas with fixed geographic coordinates in the map information.

In this regard, the computing devices may determine that the autonomous vehicle is approaching a low clearance zone based on whether a current route or trajectory of the autonomous vehicle overlaps with a low clearance zone defined in the map information. Alternatively, a low clearance zone could be detected by the autonomous vehicle's perception system in real time. This may be especially useful in situations in which there is construction or changed, growing, damaged, or moved vegetation as compared to the map information which affects the available height for the autonomous vehicle to pass through. Such low clearance zones may be detected in real time by processing sensor data generated by the autonomous vehicle's sensor system in order to identify new low clearance zones.

Based on the location of the low clearance zone, the autonomous vehicle's current position in the world, the autonomous vehicle's current route, and the autonomous vehicle's current speed, the computing devices may determine when to activate the motor. This calculation may include adding a buffer time to a known amount of time for the support system to collapse (and/or swivel). This value may then be converted to a first distance from the low clearance zone based on the current speed of the autonomous vehicle. The first distance may also be calculated based on various points on the autonomous vehicle. For example, if the location of the autonomous vehicle is based on a point on a rear axle of the autonomous vehicle, the first distance may be adjusted based on a horizontal distance between the axle and the highest, most forward point on the rooftop sensor system.

This first distance may then be converted to a location at which the computing devices should activate the motor (hereafter first activation location). This calculation may be made as soon as the autonomous vehicle detects the location of the low clearance zone, when the autonomous vehicle is a certain distance from the low clearance zone, or when the autonomous vehicle's planning system generates a trajectory that has the autonomous vehicle entering or overlapping with the low clearance zone.

In some instances, the first activation location may be recalculated as the autonomous vehicle approaches the low clearance zone. For instance, if the autonomous vehicle changes its speed this may decrease the first distance and thereby increase the amount of time to activate and collapse (and/or swivel) the support structure. This may be especially useful when a low clearance zone is detected in real time and additional sensor data can be used to verify the detection of a low clearance zone.

Once the first activation location is reached, the motor may be activated. As noted above, this may cause the support structure to collapse and/or swivel, thereby moving the rooftop sensor system to the stowed or collapsed position and reducing the total height of the autonomous vehicle. In this condition, the autonomous vehicle may safely pass through the low clearance zone. Such changes to the position of the rooftop sensor system may be considered acceptable and feasible because typically in such areas, the rooftop sensor system does not need to "look way further ahead," may not be able to do so anyway, and/or the autonomous vehicle is typically traveling at lower speeds (e.g., such as entering parking garages, or depots). Moreover, other sensors, such as those in the front, rear, or sides of the autonomous vehicle may still be used to provide a desired amount of forward trajectory information in such locations for safely navigating through such locations.

Once the autonomous vehicle has passed through the low clearance zone, the motor may be activated again in order to deploy the support structure and reposition the rooftop sensor system into the deployed condition. Again, depending on the location and length of the low clearance zone, the autonomous vehicle's current position in the world, the autonomous vehicle's current route, and the autonomous vehicle's current speed, the computing devices may determine when to activate the motor. This calculation may include adding a buffer time to a known amount of time for the support system to deploy. This value may then be converted to a second distance after the low clearance zone based on the current speed of the autonomous vehicle as well as the length of the low clearance zone to be traveled by the autonomous vehicle. Additional details, such as the buffer time, relative distance between the sensors and a reference point on the autonomous vehicle may be used to determine position, the first distance, etc.

This second distance may then be converted to a location at which the computing devices should activate the motor (hereafter second activation location). Again, the second distance may also be calculated based on various points on the autonomous vehicle. For example, if the location of the autonomous vehicle is based on a point on a rear axle of the autonomous vehicle, the second distance may be adjusted based on the horizontal distance between the axle and the highest, most forward point on the rooftop sensor system. This calculation may be made as soon as the autonomous vehicle calculates the first activation location.

In some instances, before activating the motor to deploy the support structure, the computing devices may first review sensor data to confirm that the autonomous vehicle has passed the low clearance zone. For example, sensor data from a rearward facing camera or LIDAR may be processed in order to compare the latitude/longitude of the autonomous vehicle with the ending latitude and longitude (or other) coordinates of the low clearance point. If the autonomous vehicle's current position is past the low clearance zone, the support structure may be deployed.

In some instances, once a new low clearance is detected based on sensor data from the perception system, the computing devices may update the map information to include the location of the new low clearance zone. In addition, the computing devices may send a signal to a remote computing device in order to share the location of the new low clearance zone with other autonomous vehicles of a fleet of autonomous vehicles.

The features described herein may enable a dynamic and real time adjustment of the total vehicle height. By reducing the height of the rooftop sensor system when needed while driving, this may improve the ability of autonomous vehicles to fit under areas with low hanging vegetation, overpasses, bridges, and tunnels as well as low ceiling height areas within parking garages or depots. This, in turn, may increase the autonomous vehicle's service area, routing capabilities and overall efficiency, especially in dense urban markets or areas with many low height areas.

EXAMPLE SYSTEMS

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, long distance freight trucks etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
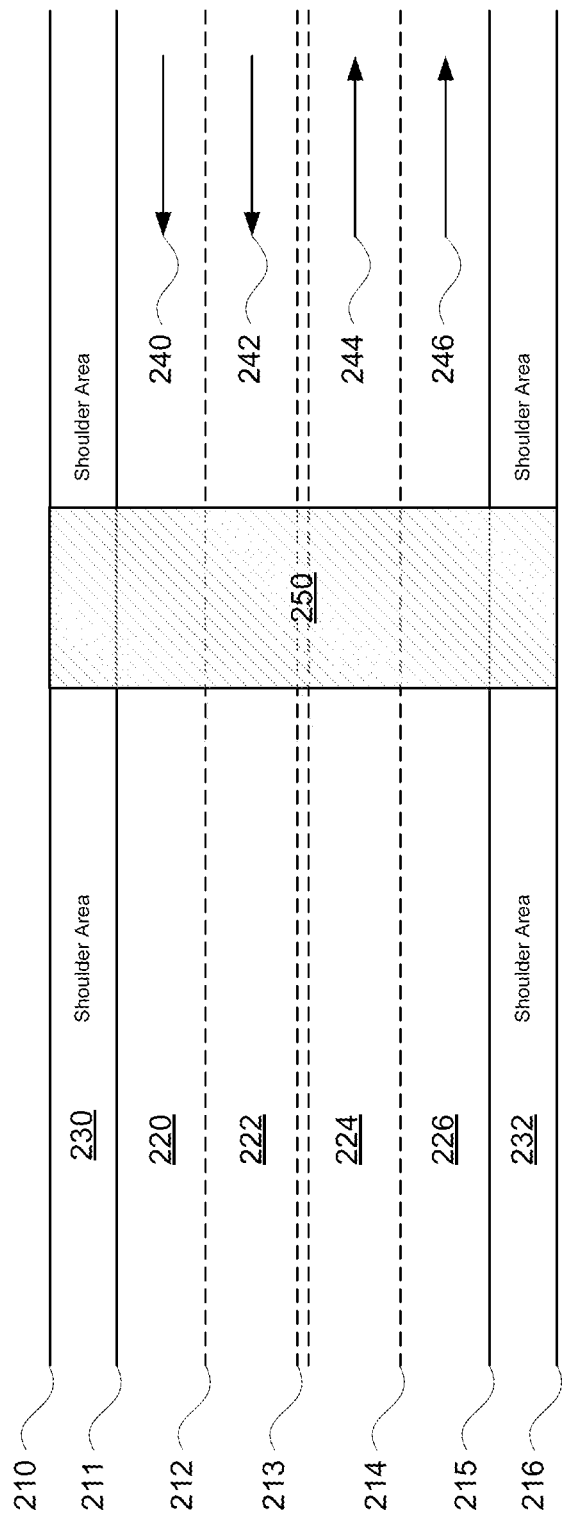
FIG. 2 is an example of map information in accordance with aspects of the disclosure.

FIG. 2 is an example of map information 200 for a geographic location corresponding to a small section of roadway. The map information 200 that includes information identifying the shape, location, and other characteristics of lane features such as curbs 210, 216, fog lines 211, 215, and more typical lane lines such as dashed lines 212 (e.g., white lane lines diving lanes of the same direction of traffic), 213 (e.g., yellow lane lines dividing lanes of different traffic directions), 214 (e.g., white lane lines diving lanes of the same direction of traffic), etc. These lane features may define the shape and boundaries of driving lanes 220, 222, 224, 226 and shoulder areas 230, 232. Although not shown, the map information also includes other features of the intersections such as traffic control devices including traffic signal lights, stop signs, yield signs, speed limit signs, informational signs, and so on. In addition to the aforementioned features and information, the map information may also include information that identifies the direction of traffic for each lane, as represented by arrows 240, 242, 244, 246, as well as information that allows the computing devices 110 to determine whether the vehicle has the right of way to complete a particular maneuver (i.e., complete a turn or cross a lane of traffic or intersection). In this regard, the map information 200 may identify various features which the autonomous vehicle 100's systems may use to localize the autonomous vehicle as well as to generate routes to a destination and trajectories to follow in order to reach that destination.

The map information may also include information about low clearance zones. Such low clearance zones may include areas with low hanging vegetation, overpasses, bridges, and tunnels as well as low ceiling height areas within parking garages or depots. Low clearance zones may be defined as points, lines between two or more points, two-dimensional areas, or three-dimensional areas with fixed geographic coordinates (e.g. latitude, longitude, and in some instances altitude) in the map information. FIG. 2 also includes a low clearance zone 250, here represented by a two-dimensional polygon which may correspond to an overpass, pedestrian bridge, or some other physical structure with a low or relatively low clearance height beneath the structure. In addition, for such low clearance zones, the map information may include additional relevant attributes and information about each low clearance zone such as the type (e.g. overpass or tunnel or vegetation etc.), length or width and coordinates (e.g., latitude, longitude, altitude, etc.) of such low clearance zones.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same driving lane or changing driving lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g., a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual driving lanes, but also the nature of driving and bicycle lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 172 may be used by computing devices 110 in order to determine the vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
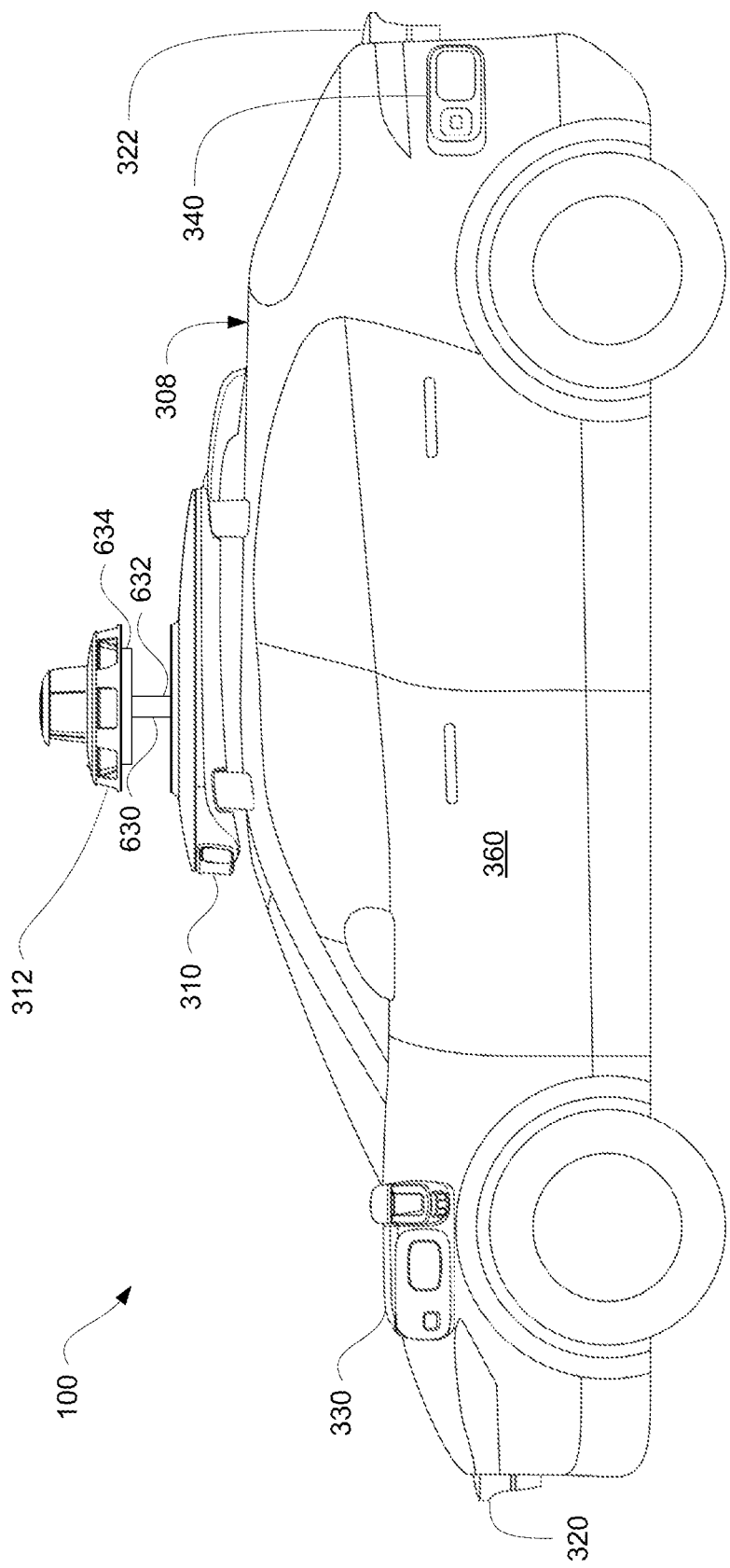
FIG. 3A-3C are example external views of a vehicle in accordance with aspects of the disclosure.
Figure 3B:
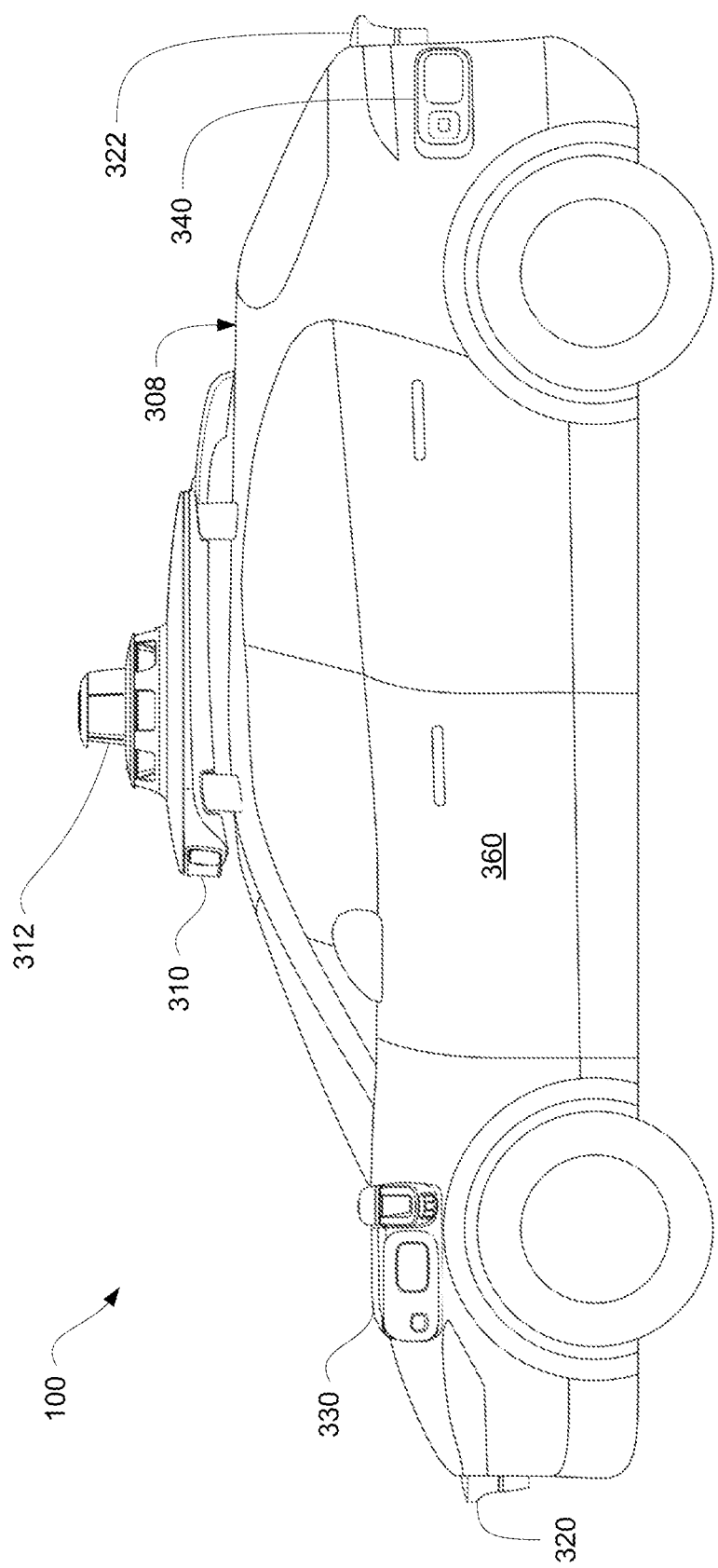
Figure 3C:
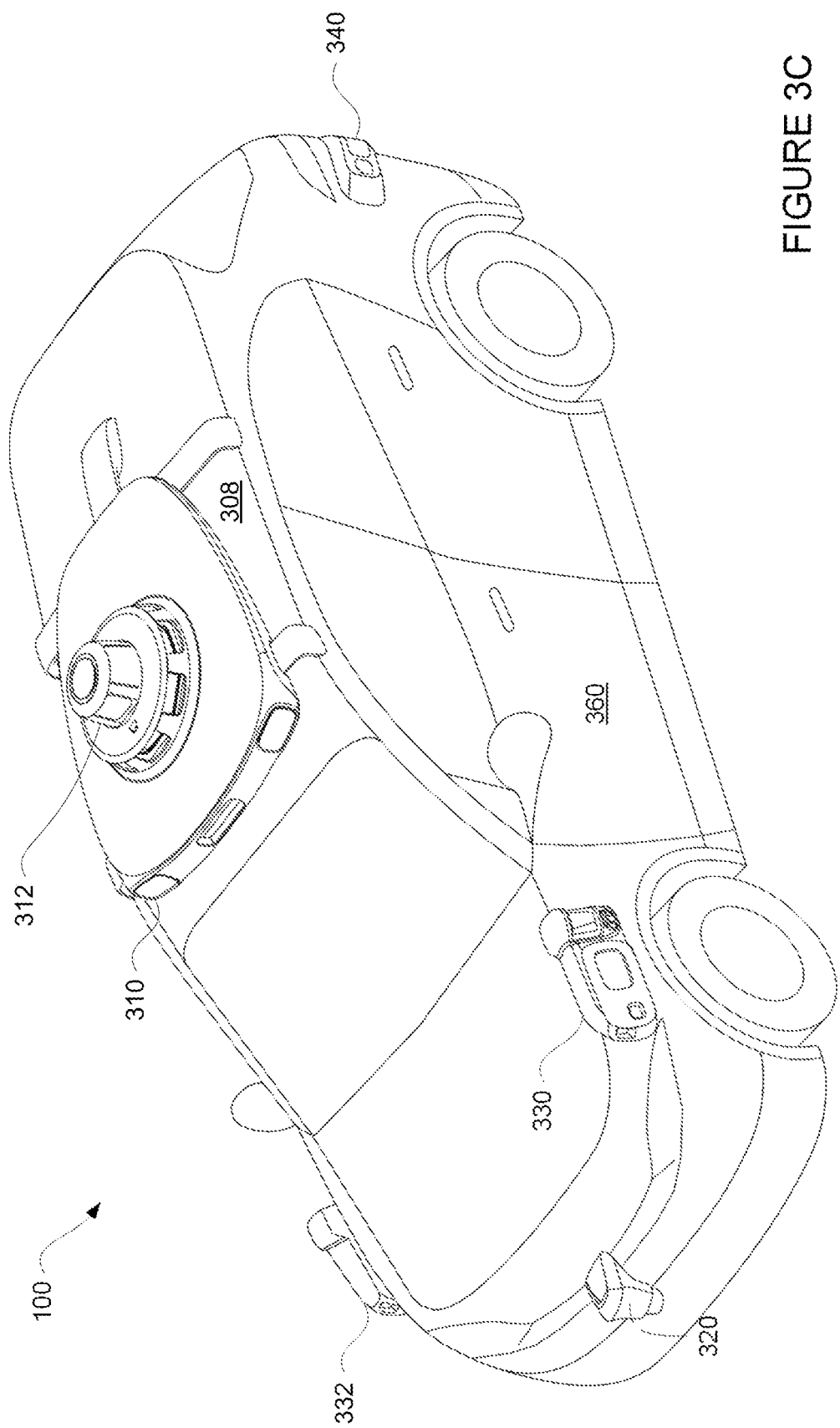

For instance, FIGS. 3A-3C are example external views of autonomous vehicle 100. In this example, the roof 308 of the autonomous vehicle includes a rooftop housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof 308 or rooftop housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g., future behavior predictions or predicted future trajectories). In this regard, different models may be used for different types of objects, such as pedestrians, bicyclists, vehicles, etc. The behavior predictions or predicted trajectories may be a list of positions and orientations or headings (e.g., poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 172 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 172 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
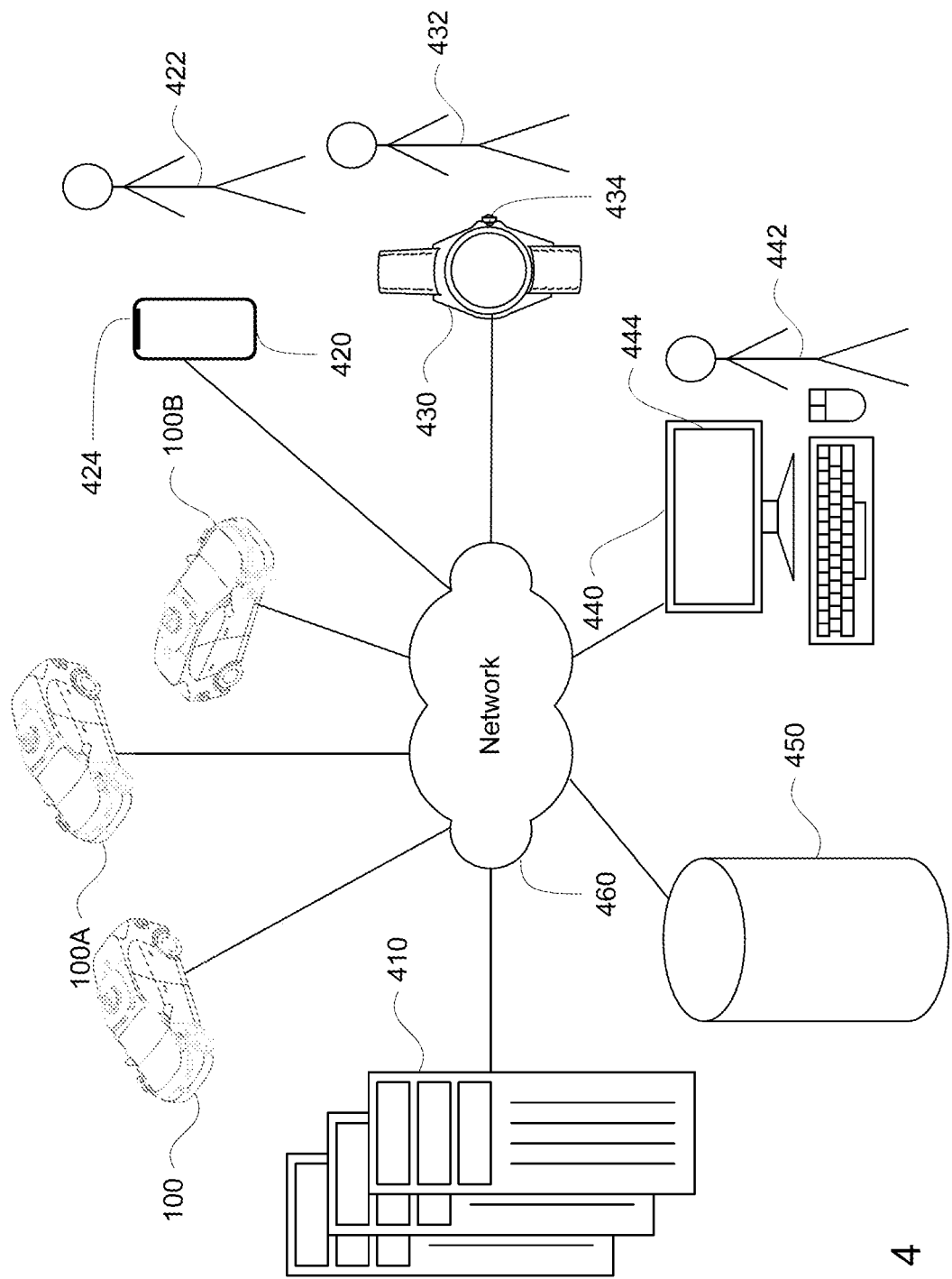
FIG. 4 is a pictorial diagram of an example system in accordance with aspects of the disclosure.
Figure 5:
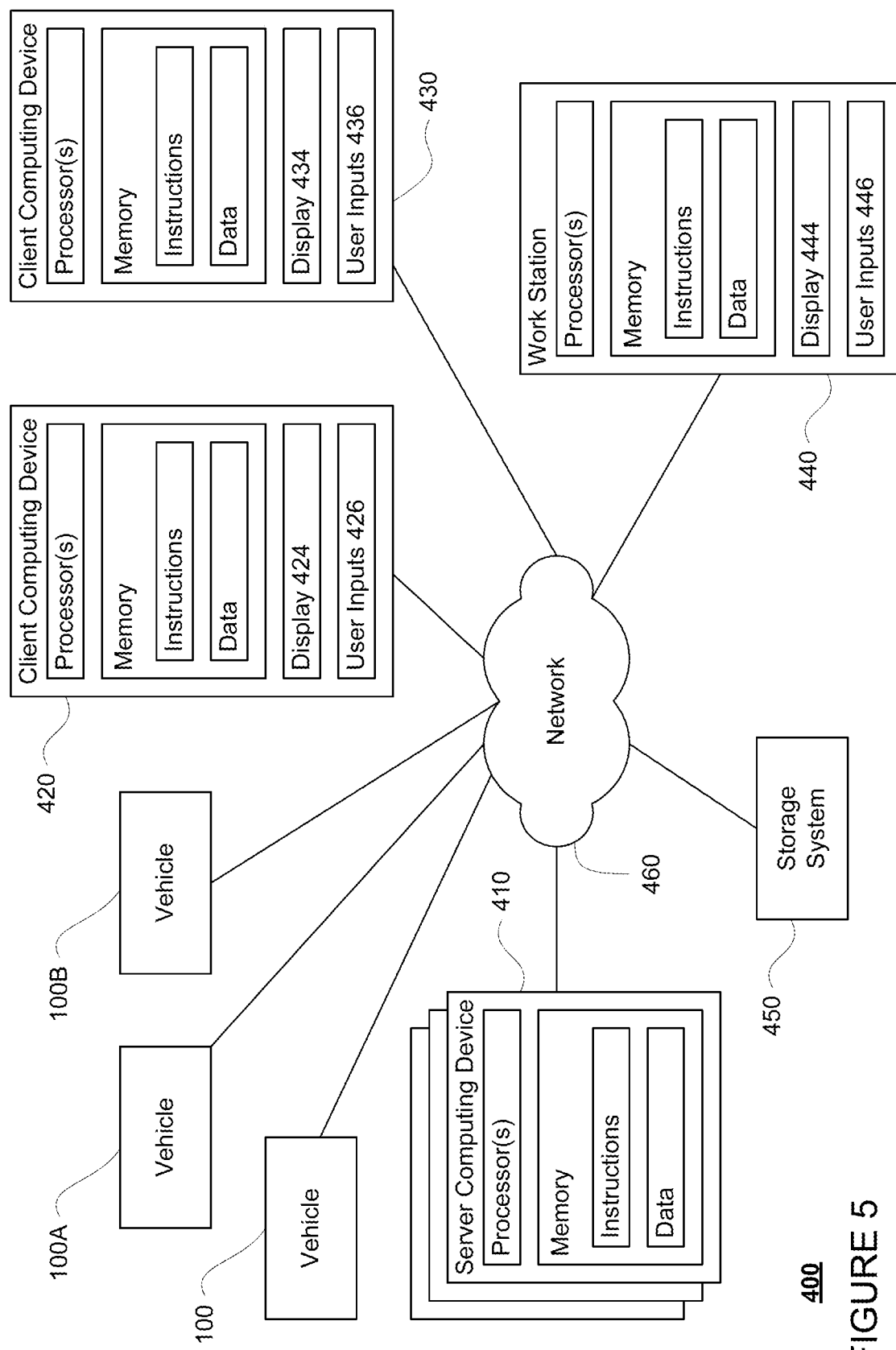
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example, the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of an autonomous vehicle. In other words, user 422 may represent a passenger or a scheduler as discussed herein. In addition, client computing device 430 may represent a smart watch for a passenger of an autonomous vehicle. In other words, user 432 may represent a passenger or a scheduler as discussed herein. The client computing device 440 may represent a workstation for an operations person, for example, a remote assistance operator or other operations personnel who may provide remote assistance to an autonomous vehicle and/or a passenger. In other words, user 442 may represent an operator (e.g. operations person) of a transportation service utilizing the autonomous vehicles 100, 100A, 100B. Although only a few passengers, schedulers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc.

Figure 6:
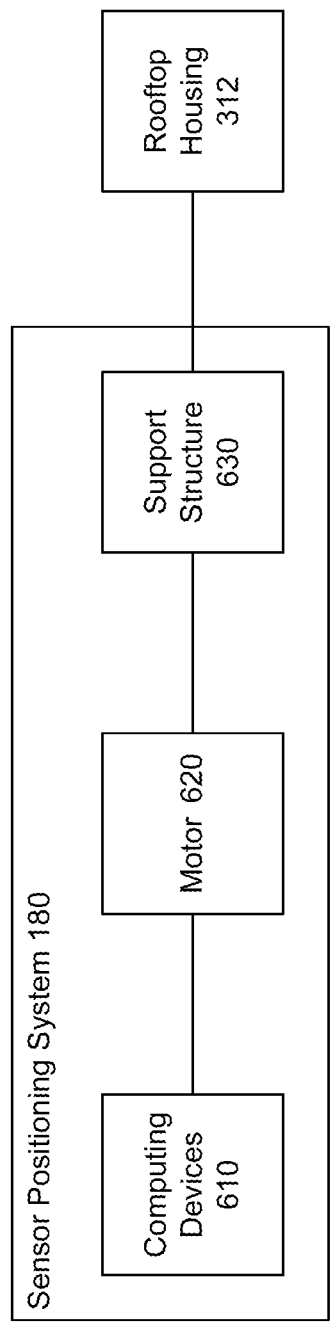
FIG. 6 is a functional diagram of a sensor positioning system in accordance with aspects of the disclosure.
Figure 7:
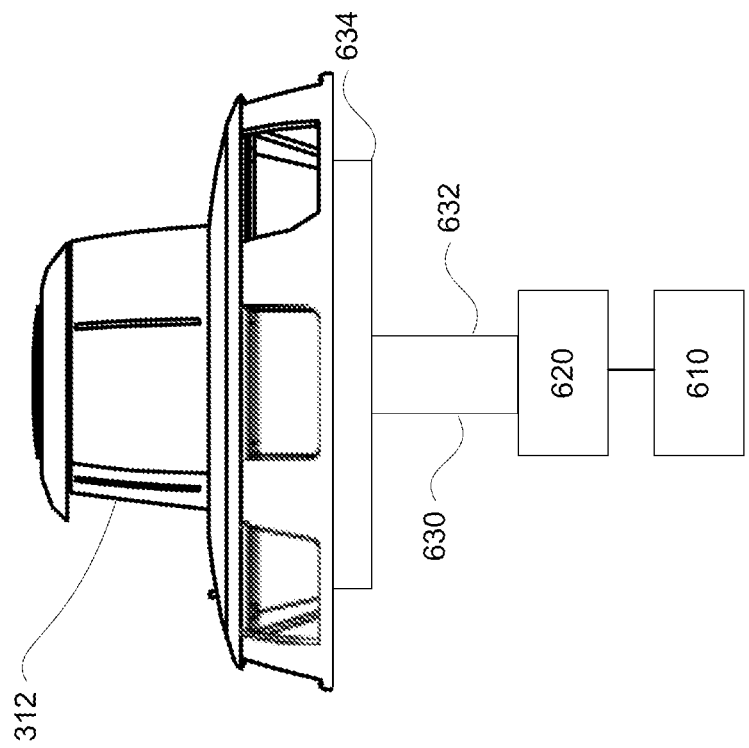
FIG. 7 is a diagram of a sensor positioning system in accordance with aspects of the disclosure.

As shown in FIG. 1, the autonomous vehicle 100 may include a sensor positioning system 180. FIG. 6 depicts a functional view of the sensor positioning system 180, and FIG. 7 depicts a pictorial view of the sensor positioning system 180. In this example, the sensor positioning system includes one or more computing devices 610, a motor 620, and a support structure 630. The support structure may be positioned on a roof of the autonomous vehicle 100 in order to support one or more rooftop housings for sensors of the perception system 174. In this example, the sensors may be housed within the upper housing 312. In this regard, the support structure 630, upper housing 312, and the sensors of the upper housing 312 may be considered a rooftop sensor system. The rooftop sensor system may include a plurality of sensors, such as cameras, LIDARs, radars, etc.

The computing devices 610 may include one or more processors and memory storing data and instructions which functions as a controller for the support structure. In this regard, the computing devices 610 may be configured similarly to the computing devices 110. The computing devices may monitor feedback from various systems and features of the autonomous vehicle in order to determine when to activate the motor. For example, the computing devices may monitor information published by the autonomous vehicle's positioning system 172, routing system 170, planning system 168, and/or a speedometer (which may provide current speed of the autonomous vehicle) and in some instances, perception system 174 to determine when to activate the motor 620. The computing devices 610 may also be able to access the map information 200.

The motor 620 may be an electric motor (or an electronic motor which does not require AC power) which engages with the support structure 630 in order to reposition the support structure based on signals from the computing devices 610.

For example, FIG. 3A represents the support structure 630 in the deployed condition, and FIGS. 3B and 3C represent the support structure in a collapsed condition. In this example, the support structure 630 may include a collapsible portion 632 (e.g., a piston, telescoping tubes, robotic arms (e.g., to allow for a swivel movement), cantilever arms (e.g., which may move and stow the rooftop sensor next to vehicle rear area), a pressurized rubber housing chamber that can inflate/deflate with motor activations, coupling systems that can stiffen/loosen or elongate/shorten such as those used in railroad locomotives to connect train cars, etc. Such features may be driven by the motor 620 between the collapsed condition and the deployed condition). The collapsible portion 632 may be attached to a physical support 634 (here a platform) which can support the upper housing 312 as well as the rooftop sensors within the housing. The motor 620 may be arranged within rooftop housing 310 and/or a compartment within the roof 308. When in the collapsed condition the support structure may be stored within rooftop housing 310 and/or a compartment within the roof 308 (e.g., in situations in which there is only a single rooftop housing rather than a rooftop housing with an upper housing).

When the motor is activated in one or a first direction, the support structure may collapse from a deployed condition to a stowed or collapsed condition, and the rest of the rooftop sensor system (e.g., the one or more sensors) may be moved towards the roof of the autonomous vehicle. When the motor is activated in another or a second direction, the support structure may be deployed from the stowed or collapsed position (as shown in FIG. 3B) to the deployed condition (as shown in FIG. 3A) and the rest of the rooftop sensor system (e.g., the one or more sensors) may be moved away from the roof of the autonomous vehicle. The collapsed condition may reduce the total height of the rooftop sensor system as well as autonomous vehicle as compared to the deployed condition. In addition, the deployed condition may position the rooftop sensor system farther from the roof improving the range but also increasing the total height.

In some instances, multiple motors may be used to reposition the support structure 630. For example, one motor may be used to collapse the support structure from a deployed condition to a stowed or collapsed condition, while a second motor may be used to redeploy the support structure to the deployed state. In other instances, the motor or motors may be replaced with mechanical features such as hydraulics, pulleys, hinges, features of the aforementioned pressurized rubber system, piston system (to enable the support structure to slide or otherwise move up and down or through different predetermined notches or holes in a hoisting shaft) etc.

An open configuration of the support structure may also be arranged to allow air flow to pass through the support structure and thereby better enable the support structure to withstand higher wind speeds and certain weather conditions. Of course, such considerations may be less important within service areas for such autonomous vehicles with restricted or lower speeds.

In other instances, more advanced and dynamic designs can be used to stow and deploy the support structure. For example, a support structure may swivel in order to move the rest of the rooftop sensor system to one or both sides of the autonomous vehicle or alternatively collapse and then swivel to one or both sides of the autonomous vehicle. For instance, the support structure may include a cantilever or robotic arm feature to enable the swiveling. If there is room available within the headliner of the autonomous vehicle, the support structure and/or a portion of the sensor system may be moved into a holding area (i.e., descend so that it is completely or partially below the roof of the autonomous vehicle). Other structures such as those which are used to enable falcon doors on vehicles as well as those which are used to enable spacecraft, aircraft, or space robots to fold in or expand may also be used.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 12:
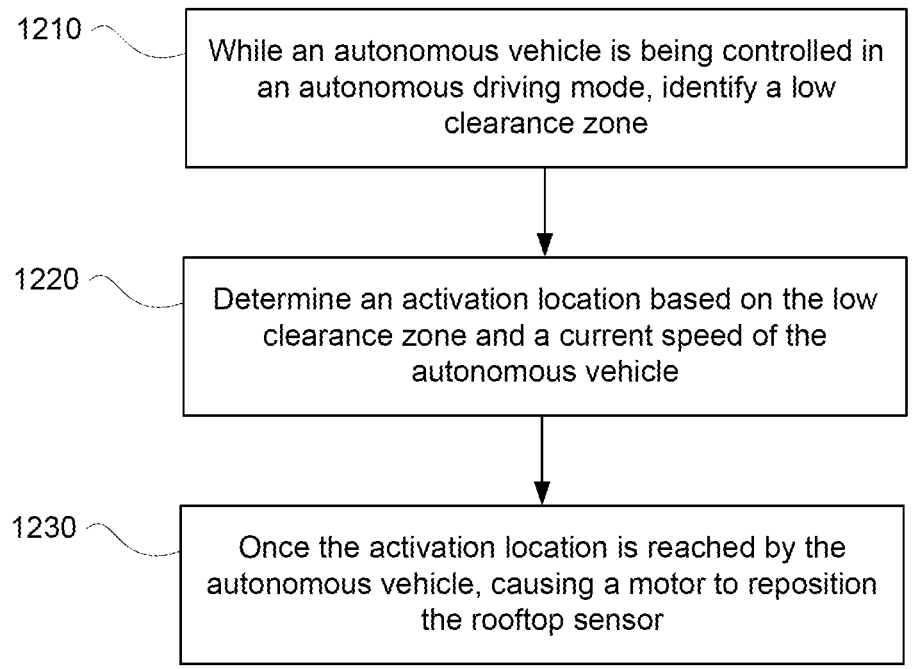
FIG. 12 is an example flow diagram in accordance with aspects of the disclosure.

FIG. 12 provides an example flow diagram 1200 for repositioning a rooftop sensor of an autonomous vehicle, which may be performed by one or more processors, such as the one or more processors of the computing devices 610. As shown in block 1210, while an autonomous vehicle is being controlled in an autonomous driving mode, a low clearance zone is identified.

Again, the computing devices 610 may receive information generated by the various systems and features of the autonomous vehicle. This may include the autonomous vehicle's current position in the world from the positioning system 172, the autonomous vehicle's current route from the routing system 170, and the autonomous vehicle's current trajectory from the planning system 168. As noted above, the computing devices 610 may also have access to map information, such as the map information 200, which may include information about low clearance zones. In this regard, the computing devices 610 may determine that the autonomous vehicle 100 is approaching a low clearance zone based on whether a current route or trajectory of the autonomous vehicle overlaps with a low clearance zone defined in the map information 200.

Figure 8:
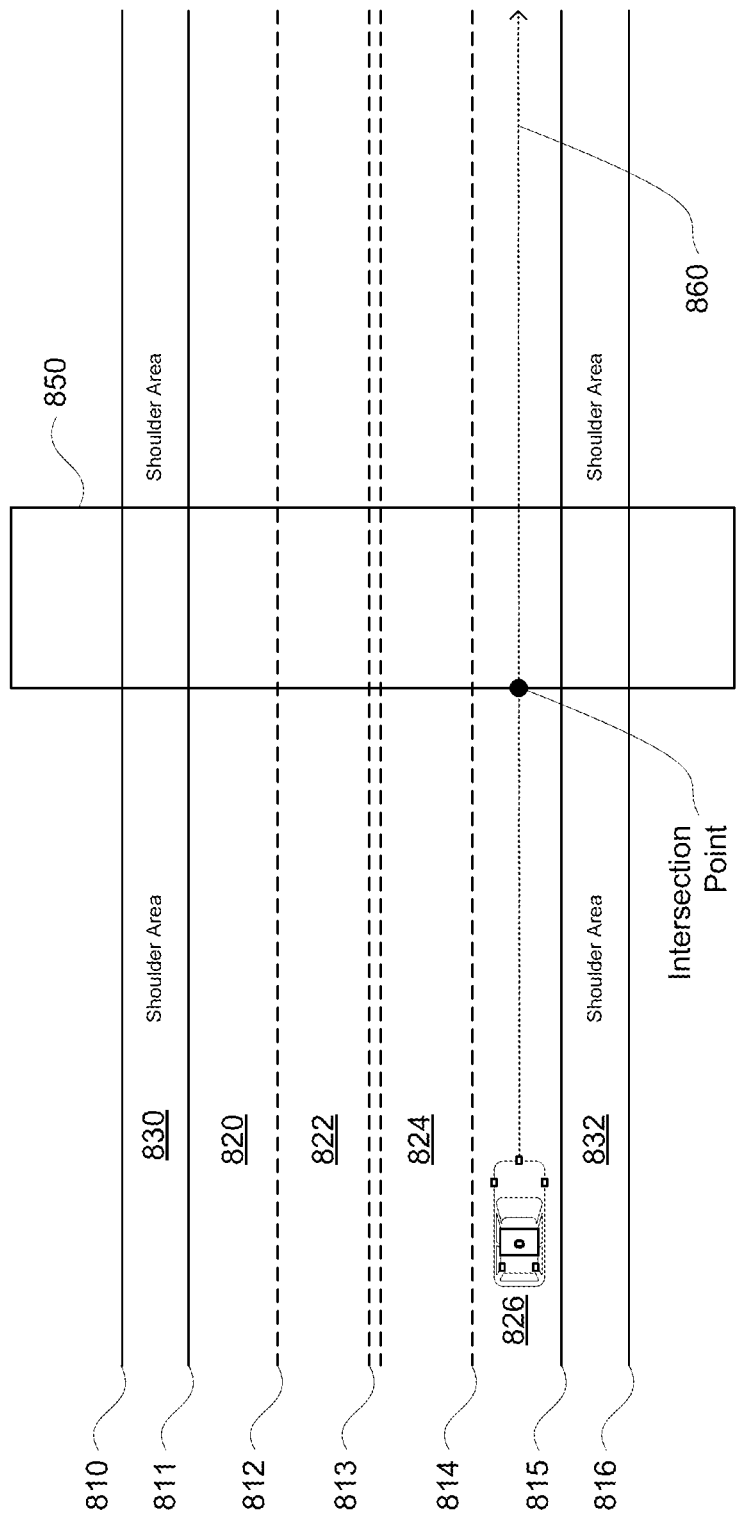
FIG. 8 is an example of an autonomous vehicle following a route in a geographic areas in accordance with aspects of the disclosure.
Figure 9:
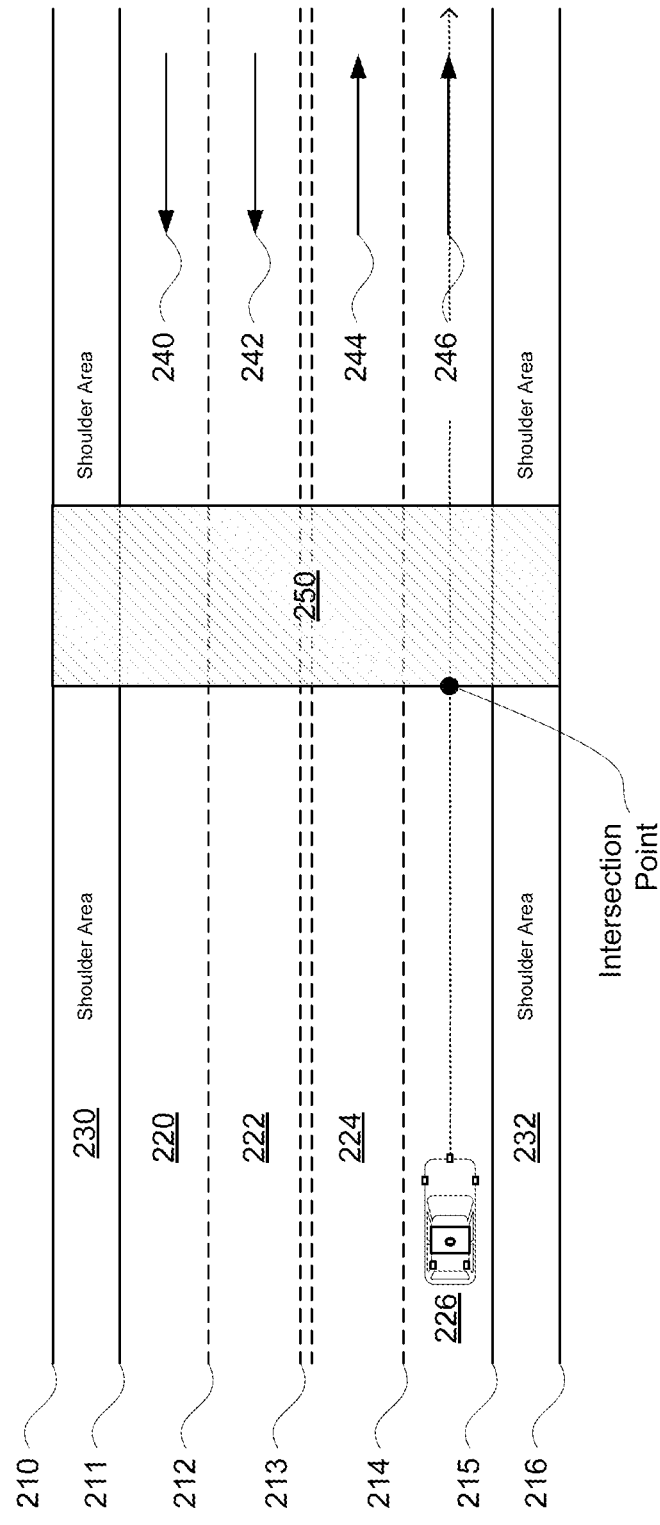
FIG. 9 is an example comparison of a route and map information in accordance with aspects of the disclosure.

FIG. 8 is an example of autonomous vehicle driving in a geographical area 800 corresponding to the geographic location and section of roadway of map information 200. In this regard, the shape, location, and other characteristics of lane features such as curbs 210, 216, fog lines 211, 215, dashed lines 212, 213, 214, driving lanes 220, 222, 224, 226, and shoulder areas 230, 232, may correspond to the shape, location, and other characteristics of lane features such as curbs 810, 816, fog lines 811, 815, dashed lines 812, 813, 814, driving lanes 820, 822, 824, 826, and shoulder areas 830, 832. In this example, the autonomous vehicle 100 is driving in driving lane 226 and following a route 860 to a destination at some location outside of the geographic area 800 (and therefore, not shown). FIG. 9 is a comparison of the location of the autonomous vehicle 100 as depicted in FIG. 8 and route 860 to the map information 200. In this example, the route 860 intersects with the area of the low clearance zone 250. As such, the computing devices 110 may identify the low clearance zone 250.

Alternatively, a low clearance zone may be detected by the perception system 174 in real time. In this regard, the perception system 174 may publish this information to the various other systems of the autonomous vehicle, including the rooftop sensor system. This may be especially useful in situations in which there is construction or changed, growing, damaged, or moved vegetation as compared to the map information which affects the available height for the autonomous vehicle 100 to pass through. Such low clearance zones may be detected in real time using classifiers or other tools and features of the perception system 174 which process sensor data generated by the autonomous vehicle's various sensors in order to identify new low clearance zones. For example, the perception system 174 may detect a pedestrian bridge corresponding to a low clearance zone 850. In this example, the route 860 intersects with the area of the low clearance zone 850. As such, the computing devices 110 may identify the low clearance zone 850.

Returning to FIG. 12, at block 1220, an activation location is determined based on the low clearance zone and a current speed of the autonomous vehicle. For instance, the computing devices 610 may receive information generated by the various systems and features of the autonomous vehicle. This may include the autonomous vehicle's current position in the world from the positioning system 172, the autonomous vehicle's current route from the routing system 170, and the autonomous vehicle's current speed, for example from the planning system 168 and/or speedometer. Based on the location of the low clearance zone, the autonomous vehicle's current position in the world, the autonomous vehicle's current route, and the autonomous vehicle's current speed, the computing devices 610 may determine when to activate the motor 620.

This calculation may include adding a buffer time (e.g., 500 milliseconds, 1 second, 2 seconds, 3 seconds or more or less) to a time when the autonomous vehicle will exit the low clearance zone. This value may then be converted to a first distance from a closest point of the low clearance zone based on the current speed and route (or current trajectory) of the autonomous vehicle 100. This closest point is represented by an intersection point shown in FIGS. 8 and 9. The first distance may also be calculated based on various points on the autonomous vehicle 100. For example, if the location of the autonomous vehicle is based on a point on a rear axle of the autonomous vehicle, the first distance may be adjusted based on a horizontal distance between the axle and the highest, most forward point on the rooftop sensor system.

Figure 10:
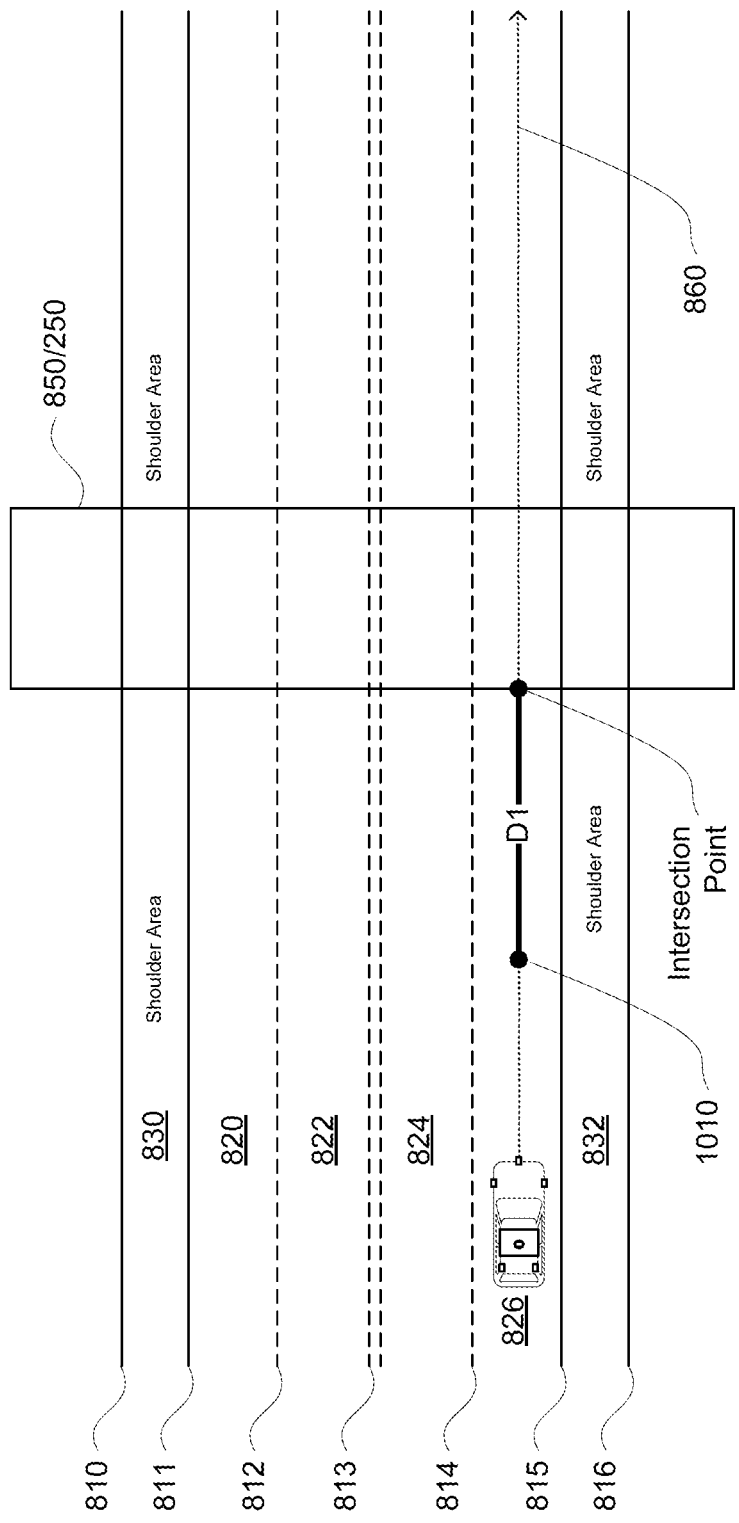
FIG. 10 is an example of an autonomous vehicle following a route in a geographic area and a first activation location in accordance with aspects of the disclosure.

This first distance may then be converted by the computing devices 610 to a location at which the computing devices should activate the motor (hereafter first activation location). This calculation may be made as soon as the autonomous vehicle detects the location of the low clearance zone (i.e., the location of the low clearance zone is within range of the perception system and/or not occluded), when the autonomous vehicle is a certain distance (along the route) from a closet point of the low clearance zone, or when the autonomous vehicle's planning system generates a trajectory that has the autonomous vehicle entering or overlapping with the low clearance zone. FIG. 10 depicts a first distance D1 along the route 860 from the intersection point and a first activation location 1010.

In some instances, the first activation location may be recalculated as the autonomous vehicle approaches the low clearance zone. For instance, if the autonomous vehicle changes its speed (e.g., slows down) this may decrease the first distance and thereby increase the amount of time to activate and collapse (and/or swivel) the support structure. This may be especially useful when a low clearance zone is detected in real time (as opposed to being identified using the map information) and additional sensor data can be used to verify the detection of a low clearance zone.

Returning to FIG. 12, at block 1230, once the activation location is reached by the autonomous vehicle, a motor is caused to reposition the rooftop sensor. Once the first activation location is reached, the motor may be activated. For example, the one or more processors of the computing devices 610 may send a signal to the motor 620. This may cause the motor 620 to move in the first direction. As noted above, this may cause the support structure to collapse and/or swivel from the deployed condition collapsed condition (as shown in FIG. 3A), thereby moving the upper housing 312 to the stowed or collapsed condition (as shown in FIG. 3B) and reducing the total height of the autonomous vehicle 100. In this condition, the autonomous vehicle 100 may safely pass through the low clearance zone. Such changes to the position of the rooftop sensor system may be considered acceptable and feasible because typically in such areas, the rooftop sensor system does not need to "look way further ahead," may not be able to do so anyway, and the autonomous vehicle is typically traveling at lower speeds. Moreover, while the rooftop sensor system is in the stowed or collapsed position, other sensors, such as those in the front, rear, or sides of the autonomous vehicle 100 may still be used to provide a desired amount of forward trajectory information in such locations for safely navigating through such locations.

Once the autonomous vehicle 100 has passed through the low clearance zone, the motor 620 may be activated again by the computing devices 610 in order to deploy the support structure and reposition the rooftop sensor system from the collapsed condition (as shown in FIG. 3B) to the deployed condition (as shown in FIGURE AB). Again, depending on the location and length of the low clearance zone, the autonomous vehicle's current position in the world, the autonomous vehicle's current route, and the autonomous vehicle's current speed, the computing devices may determine when to activate the motor. This calculation may include adding a buffer time (e.g., 500 milliseconds, 1 second, or more or less) to a known amount of time for the support system to deploy. This value may then be converted by the computing devices 610 to a second distance after the autonomous vehicle exits the low clearance zone based on the current speed of the autonomous vehicle as well as the length of the low clearance zone to be traveled by the autonomous vehicle 100 (which may be tied to the current route and/or trajectory of the autonomous vehicle). Additional details, such as the buffer time, relative distance between the sensors and a reference point on the autonomous vehicle 100 may also be used to determine position (e.g., with respect to a rear axle of the autonomous vehicle), the second distance, etc.

Figure 11:
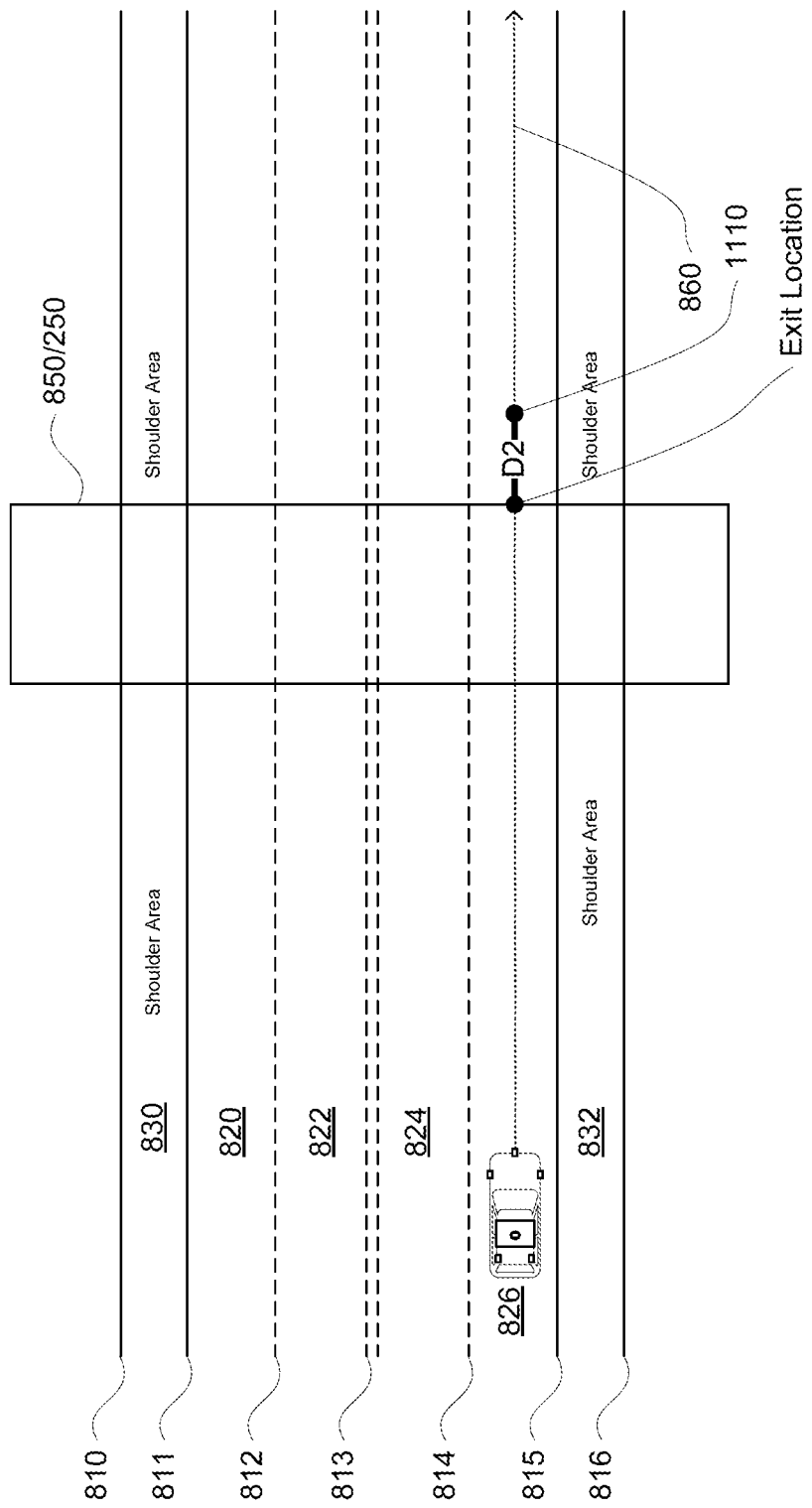
FIG. 11 is an example of an autonomous vehicle following a route in a geographic area and a second activation location in accordance with aspects of the disclosure.

This second distance may then be converted by the computing devices 610 to a location at which the computing devices should activate the motor (hereafter second activation location). Again, the second distance may also be calculated based on various points on the autonomous vehicle. For example, if the location of the autonomous vehicle is based on a point on a rear axle of the autonomous vehicle, the second distance may be adjusted based on the horizontal distance between the axle and the highest, most forward point on the rooftop sensor system. This calculation may be made as soon as the computing devices 610 calculate the first activation location. FIG. 11 depicts a second distance D2 along the route 860 from an exit location (e.g., a location where the autonomous vehicle 100 is calculated to leave the low clearance zone 250) and a second activation location 1110.

This exit location may be determined in different ways. For example, if the low clearance zone is stored in the map information, the map information and the current trajectory and/or route of the autonomous vehicle may be used to determine the exit location. In this way, the computing devices 610 may determine where and when the autonomous vehicle will pass or leave the low clearance zone (e.g. exit a parking garage or come out from under an overpass). If the low clearance zone is detected in real time, the perception system may detect when the clearance changes (e.g. whether or not some structure is still located above the autonomous vehicle).

Once the second activation location 1110 is reached, the motor may be activated. For example, the one or more processors of the computing devices 610 may send a signal to the motor 620. This may cause the motor 620 to move in the second direction. As noted above, this may cause the support structure to deploy from the collapsed condition (as shown in FIG. 3B), and thereby moving the rooftop sensor system 190 to the deployed condition (as shown in FIG. 3A) and increasing the total height of the autonomous vehicle 100. In this condition, the autonomous vehicle 100 may have a better, farther view of its surroundings.

In some instances, before activating the motor 620 to deploy the support structure 630, the computing devices 610 may first review sensor data generated by the perception system 174 in order to confirm that the autonomous vehicle 100 has passed the low clearance zone 850/250. For example, sensor data from a rearward facing camera or LIDAR sensor of the perception system 174 may be processed in order to compare the latitude/longitude of the autonomous vehicle with the ending latitude and longitude (or other) coordinates of the low clearance point (e.g., an exit point as depicted in FIG. 11). If the autonomous vehicle 100's current position (from the positioning system 172) is past the low clearance zone, the support structure 630 may be repositioned from the collapsed condition collapsed condition (as shown in FIG. 3B) to the deployed condition (as shown in FIG. 3A) as described above.

In some instances, the autonomous vehicle may be turned off (e.g. parked overnight or for some period of time) or parked while still operating. In such cases, if the sensor system is in the collapsed condition, before moving and/or proceeding to deploy the support structure, the computing devices 110 and/or 610 may use information from the perception system 174 and/or map information to determine whether the autonomous vehicle is within a low clearance zone. This may be especially useful in situations in which the autonomous vehicle is located within a depot, garage or other low clearance structure. If so, the computing devices 610 may wait until the autonomous vehicle has exited the low clearance zone before deploying the support structure. In this way, the autonomous vehicle does not extend the sensors automatically, but rather first checks to confirm whether it is safe to do so.

In some instances, once a new low clearance is detected based on sensor data from the perception system 174, the computing devices 610 may update the map information 200 to include the location of the new low clearance zone. For example, based on information detected about the low clearance zone 850, the computing devices 110 may store a polygon corresponding to the low clearance zone 850. This polygon may be somewhat different from the low clearance zone 250 which may have greater accuracy or detail. In addition, the computing devices may send a signal to a remote computing device (e.g., the server computing devices 410 or computing devices of other autonomous vehicles 100A, 100B) in order to share the location of the new low clearance zone with other autonomous vehicles of the fleet of autonomous vehicles. The autonomous vehicles of the fleet may then update locally stored versions of the map information to include the new low clearance zone and the rooftop sensors of the autonomous vehicles may be controlled accordingly (e.g. collapsed and/or deployed as described above). In this regard, the flow of information may be bi-directional between the server computing devices and the autonomous vehicles 100, 100A, 100B of the fleet.

The features described herein may enable a dynamic and real time adjustment of the total vehicle height. By reducing the height of the rooftop sensor system when needed while driving, this may improve the ability of autonomous vehicles to fit under areas with low hanging vegetation, overpasses, bridges, and tunnels as well as low ceiling height areas within parking garages or depots. This, in turn, may increase the autonomous vehicle's service area, routing capabilities and overall efficiency, especially in dense urban markets or areas with many low height clearances.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method of repositioning a rooftop sensor, the method comprising:
    while an autonomous vehicle is being controlled in an autonomous driving mode, identifying, by one or more processors, a low clearance zone;
    determining, by the one or more processors, an activation location based on the low clearance zone and a current speed of the autonomous vehicle; and
    once the activation location is reached by the autonomous vehicle, causing a motor to reposition the rooftop sensor.

2. The method of claim 1, wherein identifying the low clearance zone is based on a current route of the autonomous vehicle and the low clearance zone is defined in map information stored at the autonomous vehicle.

3. The method of claim 1, wherein identifying the low clearance zone is based on a current trajectory of the autonomous vehicle and the low clearance zone is defined in map information stored at the autonomous vehicle.

4. The method of claim 1, wherein determining the activation location is further based on a current route of the autonomous vehicle.

5. The method of claim 1, wherein determining the activation location is further based on a predefined amount of time for the rooftop sensor to be repositioned.

6. The method of claim 5, wherein determining the activation location is further based on a buffer time.

7. The method of claim 6, wherein determining the activation location includes adding the buffer time and the predefined amount of time and converting the time to a distance based on the current speed.

8. The method of claim 7, wherein determining the activation location includes measuring the distance from the low clearance zone along a current route of the autonomous vehicle.

9. The method of claim 1, wherein repositioning the rooftop sensor reduces a total height of the autonomous vehicle.

10. The method of claim 1, wherein repositioning the rooftop sensor includes collapsing a support structure.

11. The method of claim 1, wherein repositioning the rooftop sensor includes swiveling a support structure.

12. The method of claim 1, further comprising, after the autonomous vehicle has passed the low clearance zone, causing the motor to reposition the rooftop sensor by deploying a support structure.

13. The method of claim 12, further comprising, determining a second activation location for deploying the support structure based on the low clearance zone, and wherein causing the motor to reposition the rooftop sensor is further based on the second activation location.

14. The method of claim 13, wherein determining the second activation location is further based on a buffer time and current speed of the autonomous vehicle.

15. The method of claim 12, wherein deploying the support structure increases a total height of the autonomous vehicle.

16. The method of claim 12, further comprising, before deploying the support structure, using sensor data to verify that the autonomous vehicle has passed the low clearance zone.

17. A system comprising:
an autonomous vehicle;
a rooftop sensor arranged on a roof of the autonomous vehicle;
a motor; and
a controller including one or more processors configured to:
while autonomous vehicle is being controlled in an autonomous driving mode, identify a low clearance zone;
determine an activation location based on the low clearance zone and a current speed of the autonomous vehicle; and
once the activation location is reached by the autonomous vehicle, causing the motor to reposition the rooftop sensor.

18. The system of claim 17, further comprising a support structure, and wherein the one or more processors are further configured to reposition the rooftop sensor by collapsing the support structure.

19. The system of claim 17, further comprising a support structure, and wherein the one or more processors are further configured to reposition the rooftop sensor by swiveling the support structure.

20. The system of claim 17, wherein the one or more processors are further configured to, after the autonomous vehicle has passed the low clearance zone, cause the motor to reposition the rooftop sensor by deploying a support structure.

* * * * *